(12) United States Patent
Simpson

(10) Patent No.: US 9,159,060 B2
(45) Date of Patent: Oct. 13, 2015

(54) PAPERLESS RECEIPT DEVICE

(71) Applicant: Samuel K. Simpson, Beverly Hills, CA (US)

(72) Inventor: Samuel K. Simpson, Beverly Hills, CA (US)

( * ) Notice: Subject to any disclaimer, the term of this patent is extended or adjusted under 35 U.S.C. 154(b) by 36 days.

(21) Appl. No.: 14/147,557

(22) Filed: Jan. 5, 2014

(65) Prior Publication Data

US 2015/0193752 A1   Jul. 9, 2015

(51) Int. Cl.
*G06K 15/00* (2006.01)
*G06Q 20/20* (2012.01)
*H04W 8/26* (2009.01)
*G06Q 20/04* (2012.01)

(52) U.S. Cl.
CPC ............ *G06Q 20/20* (2013.01); *G06Q 20/0453* (2013.01); *G06Q 20/209* (2013.01); *H04W 8/26* (2013.01)

(58) Field of Classification Search
CPC ... G06Q 20/20; G06Q 30/06; G06Q 20/1035; G07F 19/20
USPC .................................................. 235/383, 379

IPC ......... G06Q 20/20,30/06, 20/1035; G07F 19/20
See application file for complete search history.

(56) References Cited

U.S. PATENT DOCUMENTS

2012/0319651 A1*  12/2012  Outwater et al. ............. 320/109

* cited by examiner

*Primary Examiner* — Karl D Frech
(74) *Attorney, Agent, or Firm* — Patent Ingenuity, P.C.; Samuel K. Simpson

(57) ABSTRACT

A process and apparatus provide a paperless electronic receipt. A storage device stores a communication identifier prior to a transaction at a point of transaction. Further, a transmitter sends the communication identifier to a point of transaction receipt transmission device at a point of transaction so that the point of transaction receipt transmission device sends an electronic receipt of a transaction at the point of transaction to the communication identifier based upon a selection being received at the point of transaction receipt transmission device to send the electronic receipt to the communication identifier. In addition, the electronic receipt is received and stored at the storage device based upon a selection being received at the point of transaction receipt transmission device to store the electronic receipt at the storage device.

4 Claims, 10 Drawing Sheets

PAPERLESS RECEIPT DEVICE

BACKGROUND

1. Field

This disclosure generally relates to the field of electronic communications. More particularly, the disclosure relates to electronic communication devices that provide paperless electronic receipts for transactions at a point of transaction.

2. General Background

Many point of transaction locations, e.g., point of sale locations, point of service locations, etc., currently provide paper receipts for a transaction. Many possible environmental concerns have resulted from the utilization of massive quantities of paper for printing such paper receipts on a frequent basis.

Some current approaches allow a user at a point of transaction location to request that a receipt is e-mailed to the user. Such configurations typically require a user to either input an e-mail address or provide the e-mail address to a point of transaction location representative that inputs the e-mail address. Such approaches often lead to delays at the point of transaction. Many consumers often find that having a paper receipt printed is much faster. Further, many consumers that are concerned about the environment often select a paper receipt out of concern for a possible return of an item.

Such approaches also lead to privacy concerns as many consumers do not want to provide their e-mail addresses to a significant quantity of point of transaction locations. Such consumers are often concerned about the possibility of spam e-mail.

Further, such approaches often lead to organizational concerns. Many consumers want to keep their paper receipts organized so that they may find a particular receipt if they need to return purchased items. Organizing e-mails with electronic receipts is often more difficult for many users than simply organizing a set of paper receipts. If a user has to return an item, searching through many e-mails of electronic receipts that are mixed in with e-mails not associated with electronic receipts may often be difficult.

As a result of possible delays at a point of transaction location, privacy concerns, return concerns, and organizational concerns, many consumers often request a paper receipt from a point of transaction location rather than having the receipt e-mailed to them. Accordingly, many point of transaction locations still have to provide paper receipts.

SUMMARY

A process and apparatus provide a paperless electronic receipt. A storage device stores a communication identifier prior to a transaction at a point of transaction. Further, a transmitter sends the communication identifier to a point of transaction receipt transmission device at a point of transaction so that the point of transaction receipt transmission device sends an electronic receipt of a transaction at the point of transaction to the communication identifier based upon a selection being received at the point of transaction receipt transmission device to send the electronic receipt to the communication identifier. In addition, the electronic receipt is received and stored at the storage device based upon a selection being received at the point of transaction receipt transmission device to store the electronic receipt at the storage device.

An apparatus has a display device that displays a menu. The menu includes a communication identifier display and a storage display. The apparatus has a receiver that receives a selection from the menu at a point of transaction. Further, the apparatus has a point of transaction receipt transmission device that sends an electronic receipt of a transaction at the point of transaction to a communication identifier based upon the selection being the communication identifier display or sends the electronic receipt to a storage device based upon the selection being the storage display. The communication identifier is stored by the storage device prior to the transaction at the point of transaction. The storage device is distinct from the point of transaction receipt transmission device.

An apparatus has a storage device that stores a communication identifier prior to a transaction at a point of transaction. Further, the apparatus has a transmitter that sends the communication identifier to a point of transaction receipt transmission device at a point of transaction so that the point of transaction receipt transmission device sends an electronic receipt of a transaction at the point of transaction to the communication identifier.

An apparatus has a receiver that receives an electronic receipt for a transaction at a point of transaction. Further, the apparatus has a storage device that stores the electronic receipt.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
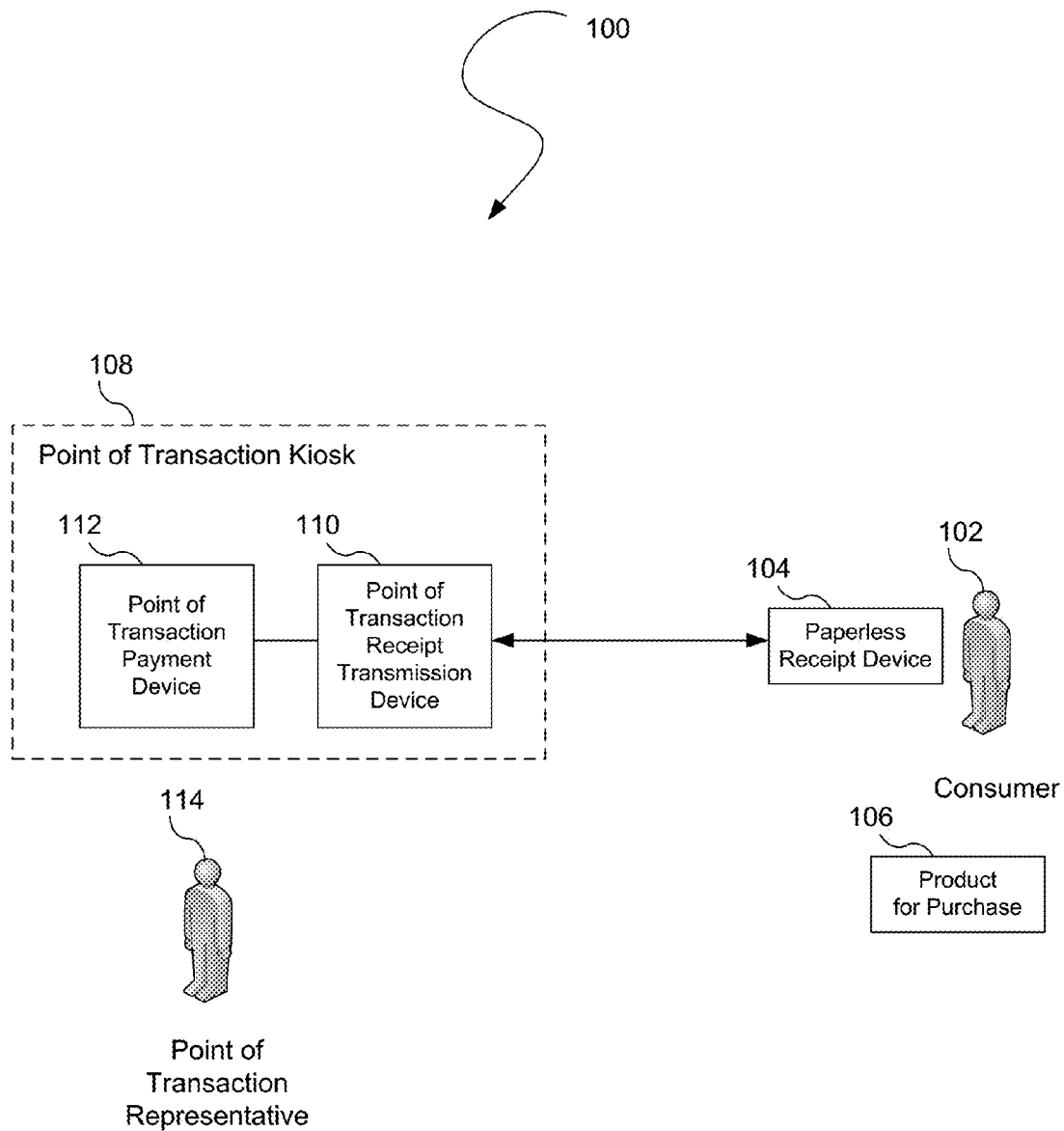
FIG. 1 illustrates a Paperless Receipt Device ("PRD") configuration.

A PRD provides an environmentally friendly approach to paperless transactions. The PRD may be utilized at a point of transaction, e.g., a point of sale transaction for a product, a point of sale transaction for a service, etc., through subsequent transactions associated with the original transaction, e.g., a return of a product. A user is able to utilize the PRD to remove the need for any paper during transactions.

The PRD may help benefit the environment by removing the massive amounts of paper utilized to print receipts during transactions at point of transaction locations. The PRD allows point of transaction locations to possibly help the environment by transitioning to providing paperless electronic receipts for transactions.

Although some environmentally friendly approaches are criticized for increasing expenses for businesses to possibly help benefit the environment, the PRD allows businesses to significantly reduce expenses and possibly help benefit the environment. Many businesses have large expenditures associated with the massive quantities of paper utilized to print paper receipts. Such businesses may remove those expenditures by implementing an infrastructure that interacts with PRDs. Further, businesses may help encourage utilization of PRDs and benefit by selling PRDs at point of transaction locations. In addition, business may even require additional fees from users that insist on paper receipts to encourage purchase and utilization of a PRD.

The PRD is also beneficial for consumers. Many consumers do not want to have to enter an e-mail address or provide an e-mail address to a point of sale representative at a point of transaction location. Entering an e-mail address or providing the e-mail address often leads to delays. In an embodiment, the PRD alleviates any need to enter a communication identifier or wait as a point of transaction representative enters the communication identifier. The PRD may store a communication identifier of the user prior to the transaction at the point of transaction location. Accordingly, the PRD transmits the e-mail address to the point of transaction location so that the point of transaction location may quickly receive the e-mail address of the user and send the electronic receipt to the user without the user having to input the communication identifier information or the point of transaction location representative having to input the communication identifier information.

Further, many consumers often have piles of receipts that are unorganized. As a result, such consumers often have difficulty finding a receipt for a possible return of a purchased product. The PRD allows for users to receive receipts electronically in an organized manner. The PRD may be utilized to store electronic receipts by a transaction identifier, e.g., a product barcode, such that a user may bring the PRD to the point of transaction location where the product was purchased and retrieve the electronic receipt via the transaction identifier for a return. The user does not have to search through piles of receipts and/or possibly lose a paper receipt. The PRD electronically organizes the electronic receipts for the user. The user may obtain a refund or a product, service, etc., without the cumbersome process of searching for a paper receipt.

In an embodiment, the PRD is directed toward privacy concerns by providing users with the ability to select between receiving an electronic receipt at a communication identifier, e.g., an e-mail address, a telephone number at which a text message may be received, etc., or having the electronic receipt directly stored on the PRD itself. As a result, users that are hesitant to provide a communication identifier to a point of transaction location to avoid spam may possibly help the environment through utilization of a PRD rather than a paper receipt.

Various implementations of the PRD may be utilized. In an embodiment, the PRD provides the user with the ability to select between receiving an electronic receipt at a communication identifier, e.g., an e-mail address, or receiving the electronic receipt directly at the PRD itself. In another embodiment, the PRD is only directed to providing the user with the ability to receive the electronic receipt at the communication identifier. In yet another embodiment, the PRD is only directed toward receiving the electronic receipt at the PRD itself.

FIG. 1 illustrates a PRD configuration 100. As an example, the PRD configuration 100 is illustrated at a point of transaction location. A consumer 102 has a PRD 104. The PRD 104 may be a device that is attached to a keychain, carried by the consumer 102, etc. Alternatively, the PRD 104 may be a computing device such as a smartphone, tablet device, etc. that has an application or other code that performs the PRD functionality.

The consumer 102 wants to purchase a product 106 for purchase. The consumer 102 approaches a point of transaction kiosk 108 to provide payment for the product 106 and obtain a paperless electronic receipt. The point of transaction kiosk 108 includes a point of transaction receipt transmission device 110 and a point of transaction payment device 112. For example, the point of transaction payment device 112 may be a register that may or may not have a corresponding display device at which a user provides payment. The point of transaction receipt transmission device may be part of the display device at which a user provides payment, may be part of the point of transaction payment device 112, or may be a different device. The point of transaction kiosk 108 may be implemented as an integrated device or multiple devices.

The point of transaction kiosk 108 may be operated by a point of transaction representative 114. For example, the point of transaction representative 114 may scan the product 106 for purchase at the point of transaction kiosk 108 and accept payment at the point of transaction kiosk 108 or direct the consumer 102 to provide payment at the point of transaction kiosk 108. Alternatively, the point of transaction kiosk 108 may be operated without the point of transaction representative 114. For example, the consumer 102 may scan the product 106 for purchase and provide payment at the point of transaction kiosk 108.

Figure 2:
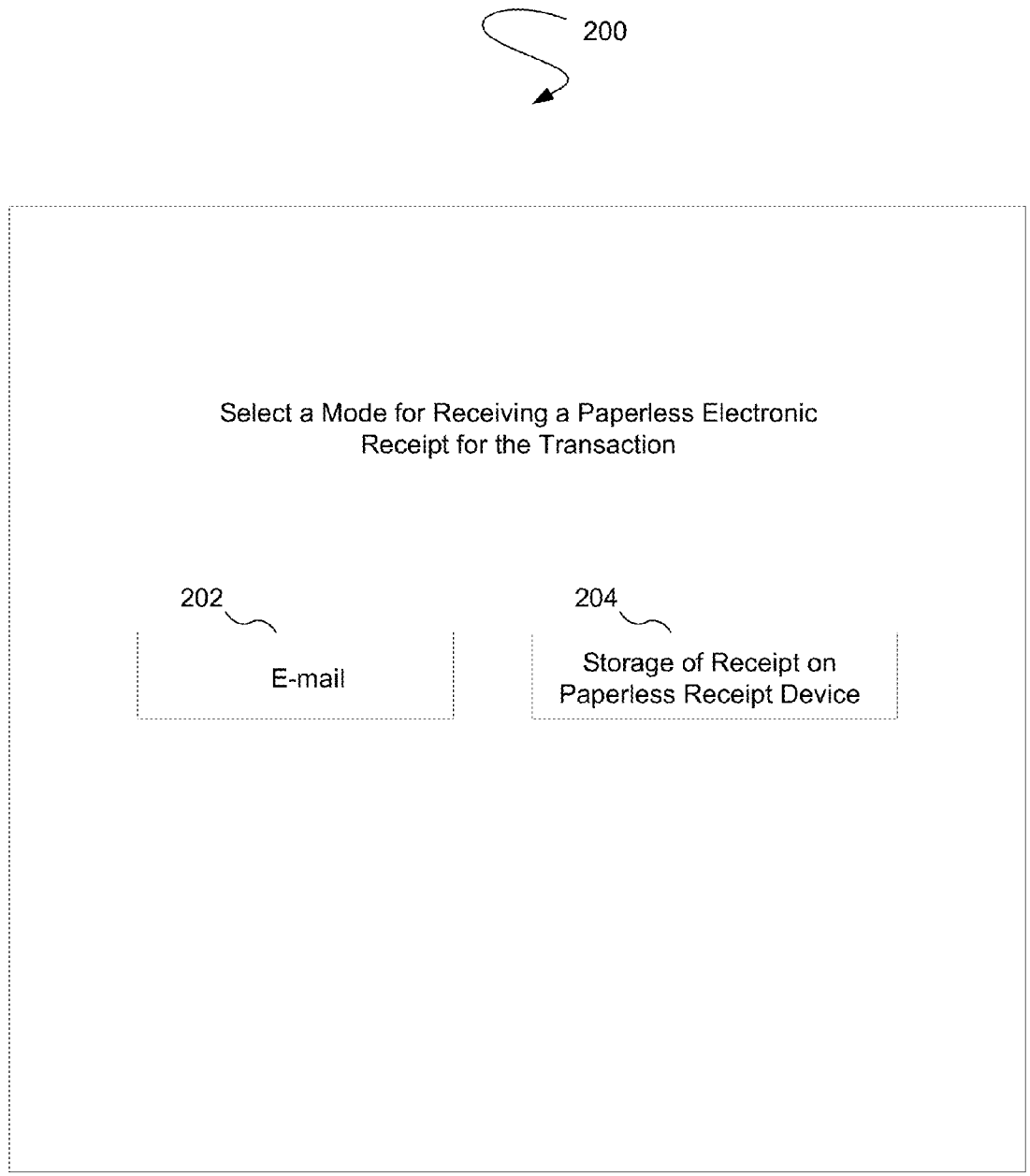
FIG. 2 illustrates a display screen that receives a selection from the consumer for a mode of receiving a paperless electronic receipt for the purchase transaction of the product for purchase illustrated in FIG. 1.

After providing payment, the consumer 102 may select the manner of transmitting a paperless electronic receipt for the transaction. FIG. 2 illustrates a display screen 200 that receives a selection from the consumer 102 for a mode of receiving a paperless electronic receipt for the purchase transaction of the product 106 for purchase illustrated in FIG. 1. The display screen 200 may be integrated as part of a device of the point of transaction kiosk 108 or may be a different device that is part of the point of transaction kiosk 108. For example, the display 200 may be part of the point of transaction receipt transmission device 110 illustrated in FIG. 1.

As an example, the display screen 200 illustrates a menu of buttons from which the consumer 102 may select a mode of transmitting the paperless electronic receipt. Selection of an e-mail button 202 allows the consumer 102 to receive the paperless electronic receipt at an e-mail address that has been previously stored at the PRD 104 illustrated in FIG. 1. Alternatively, selection of a storage button 204 allows the consumer 102 to receive the paperless electronic receipt directly at the PRD 104.

Figure 3:
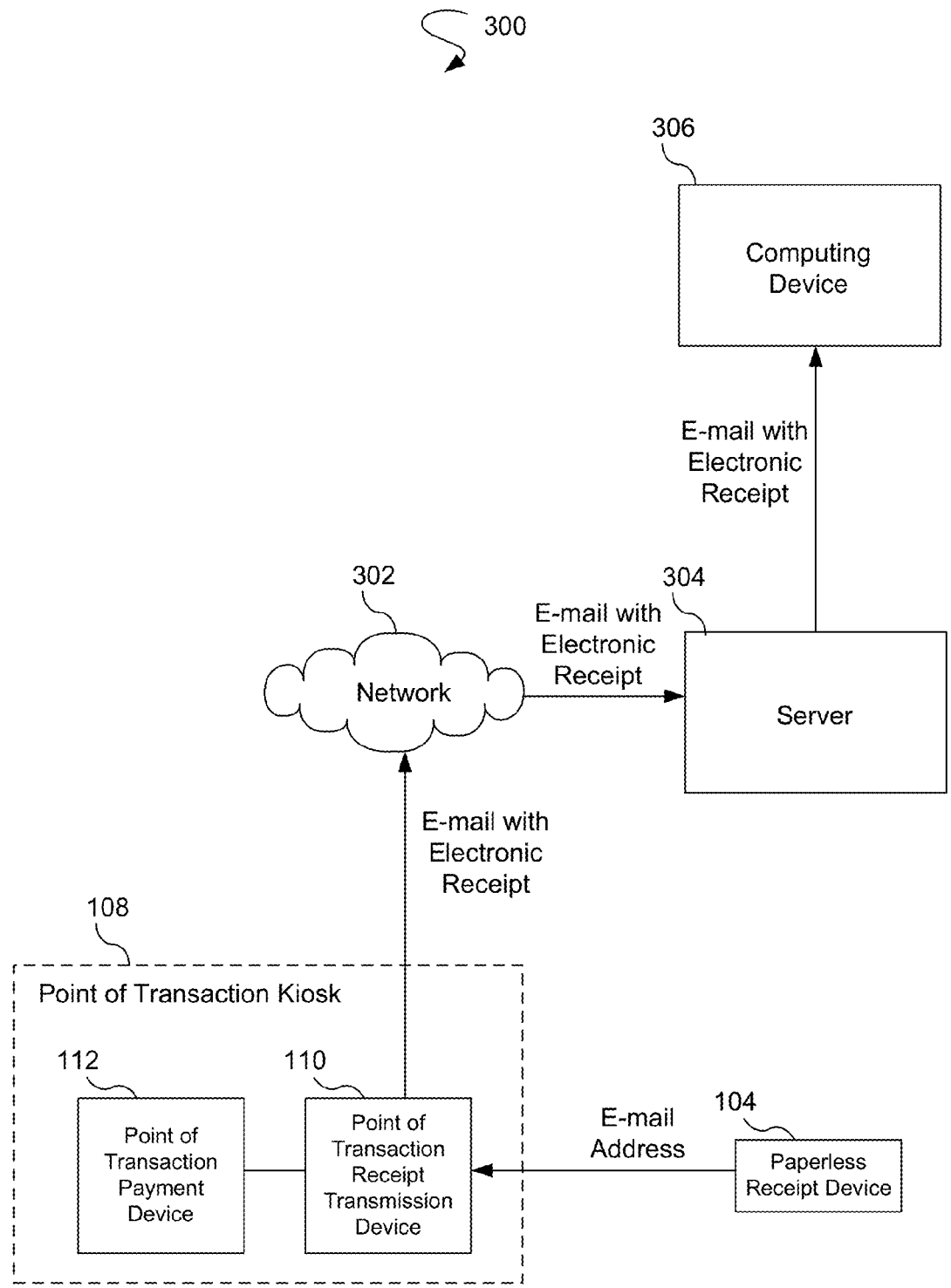
FIG. 3 illustrates an e-mail configuration that may be utilized to send the electronic receipt to the e-mail address stored by the PRD.

If the consumer 102 selects the e-mail button 202 illustrated in FIG. 2, a paperless electronic receipt for the transaction is e-mailed to the e-mail address stored by the PRD 104. FIG. 3 illustrates an e-mail configuration 300 that may be utilized to send the electronic receipt to the e-mail address stored by the PRD 104. The PRD 104 sends the e-mail address stored by the PRD 104 to the point of transaction receipt transmission device 110 at the point of transaction kiosk 108. Alternatively, the PRD 104 may send the e-mail address stored by the PRD 104 to the point of transaction payment device 112 or another device at the point of transaction kiosk 108 that subsequently sends the e-mail address to the point of transaction receipt transmission device 110.

The consumer 102 may store the e-mail address at the PRD 104 by connecting the PRD 104 to a computing device, e.g., a smartphone, tablet device, personal computer, laptop, kiosk, etc. For example, the consumer 102 may plug the PRD 104 into a USB port or other type of port at a computing device. Alternatively, the consumer 102 may connect the PRD 104 to the computing device via a wired connection. As yet another alternative, the consumer 102 may connect the PRD 104 to the computing device via a wireless connection such as radio frequency ("RF") or any other type of wireless connection. As another alternative, the consumer 102 may request that the point of transaction representative 114 store the e-mail address at the PRD 104. The point of transaction representative 114 may utilize point of transaction kiosk 108 or a computing device so that the consumer 102 may utilize the PRD 104 with a stored e-mail address for transactions. The consumer 102 may update the e-mail address stored on the PRD 104 with any of these approaches.

As the e-mail address is stored on the PRD 104, the e-mail address may be provided from the PRD 104 to the point of transaction receipt transmission device 110 without the consumer 102 or the point of transaction representative 114 having to manually enter the e-mail address at the point of transaction kiosk after payment. Subsequent to the selection of the e-mail button 202 illustrated in FIG. 2, the point of transaction receipt transmission device 110 may automatically receive the e-mail address from the PRD 104. Various modes of communication may be utilized for the point of transaction receipt transmission device 110 to automatically receive the e-mail address from the PRD 104.

In an embodiment, an integrated connection allows for such communication. For example, the point of transaction receipt transmission device 110 may have a port, e.g., a USB port, such that the consumer 102 may plug the PRD 104 into the point of transaction receipt transmission device 110. For instance, the consumer 102 may plug the PRD 104 into the point of transaction receipt transmission device 110 prior to or subsequent to the selection of the e-mail button 202 illustrated in FIG. 2. After selection of the e-mail button 202 and plugging of the PRD 104 into the point of transaction receipt transmission device 110, the point of transaction receipt transmission device 110 may then retrieve the e-mail address from a storage device, e.g., a memory, of the PRD 104. Alternatively, a wired connection may be utilized.

In another embodiment, a wireless connection may be utilized to provide the e-mail address from the PRD 104 to the point of transaction receipt transmission device 110. For example, an optical scanner, magnetic scanner, etc., may be utilized to scan the e-mail address from the PRD 104. A scanner may be situated at the point of transaction kiosk 108 such that the consumer 102 situates the PRD 104 in proximity to the scanner so that the scanner scans the e-mail address from the PRD 104.

In yet another embodiment, the PRD 104 wirelessly emits the e-mail address to the point of transaction receipt transmission device 110 through an RF connection. Alternatively, the PRD 104 wirelessly emits the e-mail address to the point of transaction receipt transmission device 110 through an infrared ("IR") connection.

As another alternative, the PRD 104 may only wirelessly emit the e-mail address upon being within proximity to the point of transaction receipt transmission device 110. For example, the PRD 104 may have a Near Field Communication ("NFC") processor. The point of transaction receipt transmission device 110 may also have an NFC processor. The NFC processor in the PRD 104 may detect the presence of the NFC processor in the point of transaction receipt transmission device 110 as the PRD 104 is moved to within a proximity to the point transaction receipt transmission device 110. Upon such detection, the NFC processor in the PRD 104 may allow the e-mail address to be sent to the point of transaction receipt transmission device 110.

A variety of modes of communication may be utilized to provide the e-mail address or other communication identifier from the PRD 104 to the point of transaction receipt transmission device 110. The examples provided for modes of communication are provided as examples and are not intended to be limiting examples.

Upon receipt of the e-mail address or other communication identifier from the PRD 104, the point of transaction receipt transmission device 110 sends an e-mail with the electronic receipt of the transaction to the e-mail address through a network 302. The e-mail with the electronic receipt is received at a server 304 through the network 302. The consumer 102 may then access the electronic receipt by retrieving the e-mail with the electronic receipt at a computing device 306.

Figure 4:
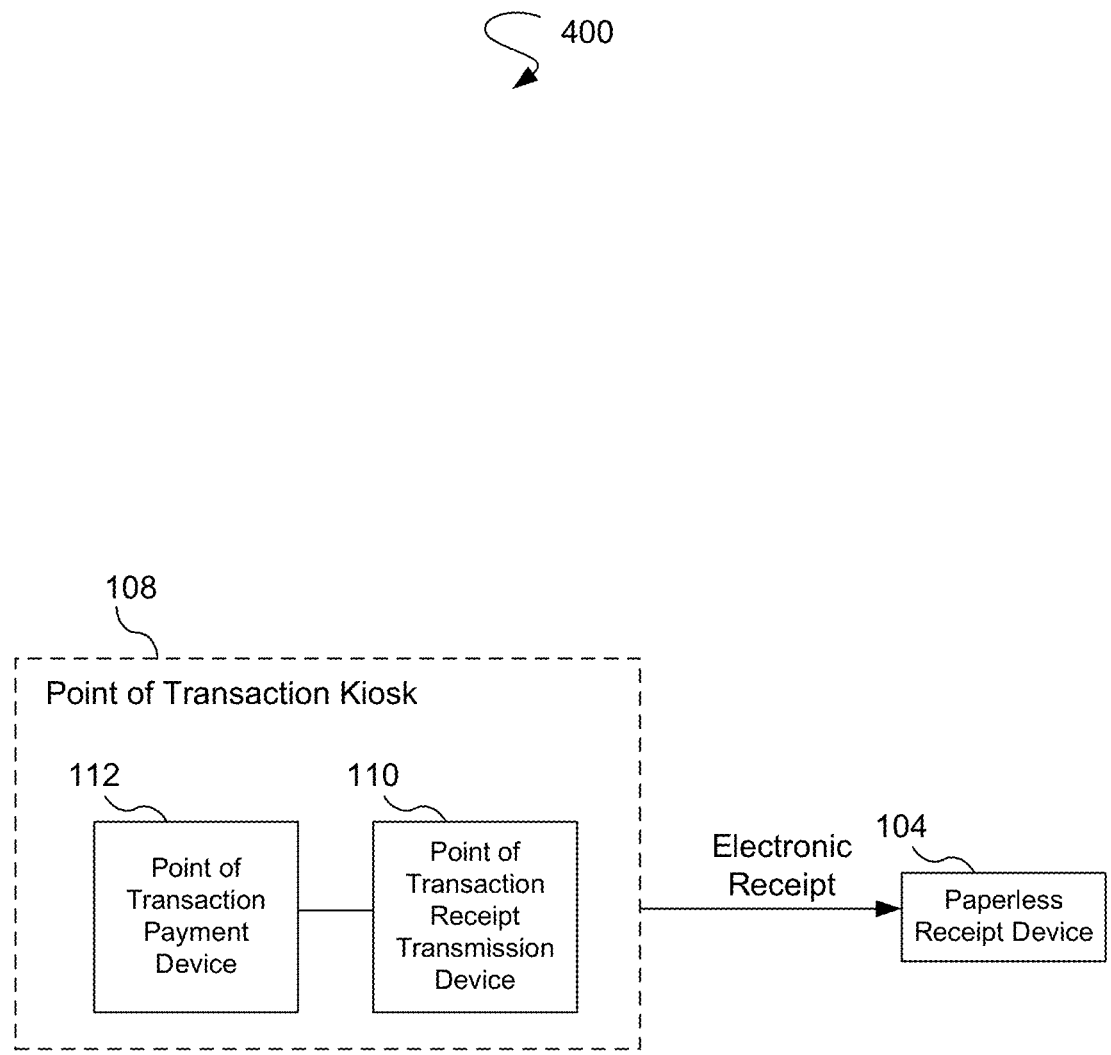
FIG. 4 illustrates a storage configuration that may be utilized to store the electronic receipt at the PRD.

If the consumer 102 selects the storage button 204 illustrated in FIG. 2, a paperless electronic receipt for the transaction is stored directly on a storage device, e.g., a memory, at the PRD 104. FIG. 4 illustrates a storage configuration 400 that may be utilized to store the electronic receipt at the PRD 104. Rather than receiving an e-mail, the consumer 102 may store the electronic receipt in addition to other electronic receipts at the PRD 104. As a result, the consumer 104 may possibly store all electronic receipts at the PRD 104. The consumer 104 may then organize those receipts into various folders or simply keep a list of the receipts by displaying the electronic receipts at a computing device that is subsequently connected with the PRD 104. Various modes of communication may be utilized for the point of transaction receipt transmission device 110 to automatically store the electronic receipt at the PRD 104.

In an embodiment, an integrated connection allows for such communication. For example, the point of transaction receipt transmission device 110 may have a port, e.g., a USB port, such that the consumer 102 may plug the PRD 104 into the point of transaction receipt transmission device 110. For instance, the consumer 102 may plug the PRD 104 into the point of transaction receipt transmission device 110 prior to or subsequent to the selection of the e-mail button 202 illustrated in FIG. 2. After selection of the storage button 202 and plugging of the PRD 104 into the point of transaction receipt transmission device 110, the point of transaction receipt transmission device 110 may then store the electronic receipt at a storage device, e.g., a memory, of the PRD 104. Alternatively, a wired connection may be utilized.

In another embodiment, a wireless connection may be utilized to store the electronic receipt at the PRD 104 from the point of transaction receipt transmission device 110. For example, an optical scanner, magnetic scanner, etc., may be utilized by the PRD 104 to scan the electronic receipt from the point of transaction receipt transmission device 110.

In yet another embodiment, the point of transaction receipt transmission device 110 wirelessly emits the electronic receipt to the point of transaction receipt transmission device 110 through an RF connection. Alternatively, the point of transaction receipt transmission device 110 wirelessly emits the electronic receipt to the PRD 104 through an IR connection.

As another alternative, the point of transaction receipt transmission device 110 may only wirelessly emit the e-mail address upon being within proximity to the PRD 104. For example, the PRD 104 may have an NFC processor. The point of transaction receipt transmission device 110 may also have an NFC processor. The NFC processor in the point of transaction receipt transmission device 110 may detect the presence of the NFC processor in the PRD 104 as the PRD 104 is moved to within a proximity to the point transaction receipt transmission device 110. Upon such detection, the NFC processor in the point of transaction receipt transmission device 110 may send the electronic receipt to the PRD 104.

A variety of modes of communication may be utilized to provide the electronic receipt from the point of transaction transmission device 110 to the PRD 104. The examples provided for modes of communication are provided as examples and are not intended to be limiting examples.

Figure 5:
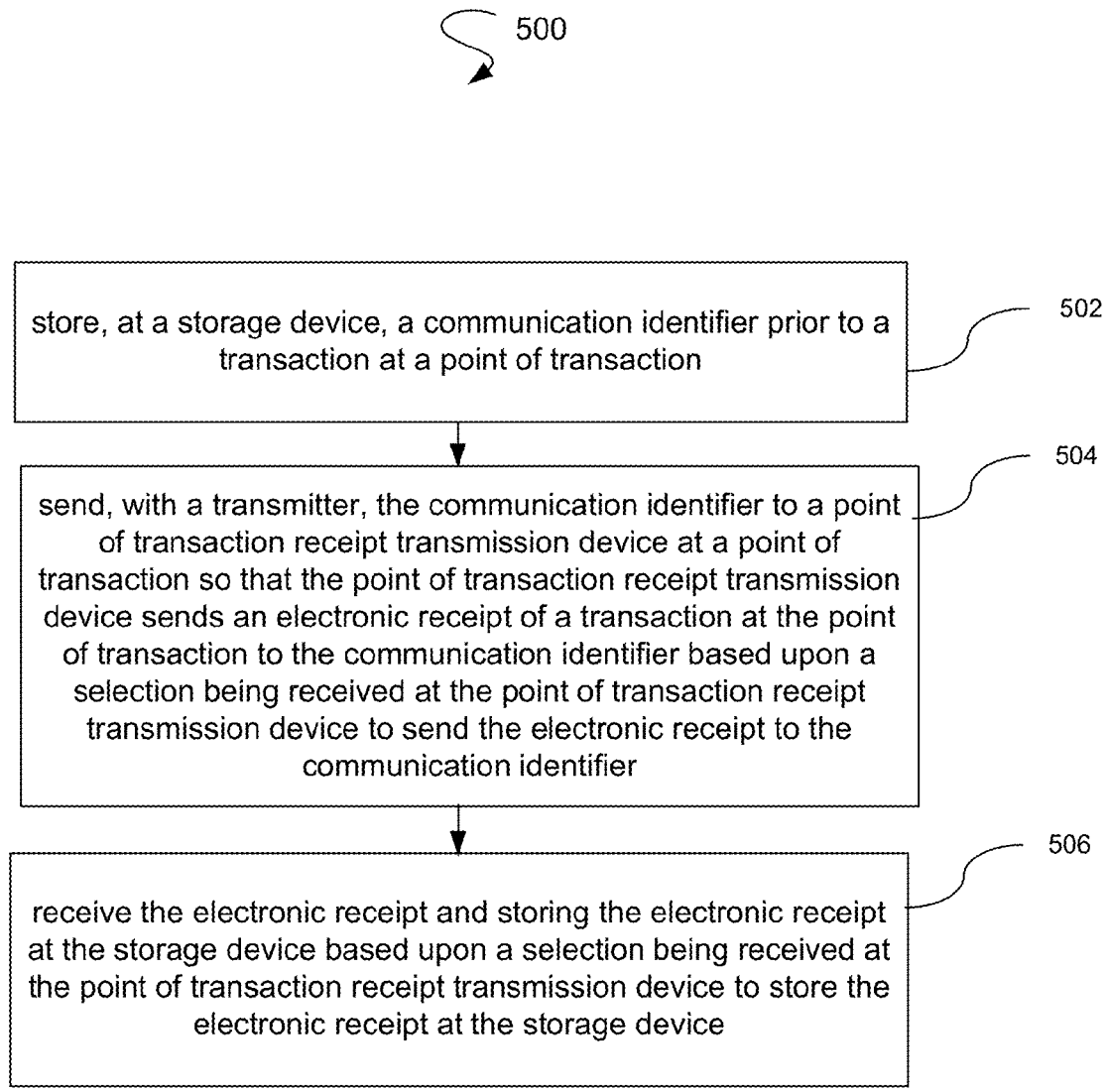
FIG. 5 illustrates a process that may be utilized to provide a paperless electronic receipt.

FIG. 5 illustrates a process 500 that may be utilized to provide a paperless electronic receipt. At a process block 502, the process 500 stores, at a storage device, a communication identifier prior to a transaction at a point of transaction. Further, at a process block 504, the process 500 sends, with a transmitter, the communication identifier to a point of transaction receipt transmission device at a point of transaction so that the point of transaction receipt transmission device sends an electronic receipt of a transaction at the point of transaction to the communication identifier based upon a selection being received at the point of transaction receipt transmission device to send the electronic receipt to the communication identifier. In addition, at a process block 506, the process 500 receives the electronic receipt and storing the electronic receipt at the storage device based upon a selection being received at the point of transaction receipt transmission device to store the electronic receipt at the storage device.

In an embodiment, the PRD 104 is payment format independent. In other words, the PRD 104 does not rely on any particular form of payment to be utilized. The PRD 104 may be utilized to send or store an electronic receipt irrespective of the form of payment utilized because the PRD 104 is directed toward an electronic receipt rather than the particular type of transaction for the electronic receipt. For example, the PRD 104 is not limited to utilization for credit card transactions. The PRD 104 may be utilized for cash transactions, credit card transactions, debit card transactions, gift card transactions, reward points transactions, and transactions that do not involve any form of payment. The PRD 104 allows a user to electronically receive and/or store receipts for any type of transaction involving a receipt.

Such payment format independence allows applicability for an entire environmentally friendly solution. For example, a store that sells merchandise to customers with a variety of different types of forms of payment has to provide an environmental solution for all of the forms of payment. The store would otherwise have to continue printing massive quantities of paper receipts for the customers that do not want to receive an e-mailed receipt and cannot directly store an electronic receipt. To effectively reduce and possibly eliminate the utilization of paper receipts from the store, an environmentally friendly solution has to be payment format independent. The PRD 104 provides such a solution by being payment format independent. Accordingly, such store may implement a configuration to receive the PRD 104 and encourage customers to utilize the PRD 104 so that the store may drastically reduce and possibly eliminate utilization of paper receipts.

Figure 6:
FIG. 6 illustrates a display screen that is displayed after the PRD communicates with the computing device.

The PRD 104 may be utilized to organize the electronic receipts directly stored on the PRD 104. For example, the PRD 104 may have communication capability with a computing device, e.g., through a USB port, wireless connection, etc. For instance, the PRD 104 may be plugged into a USB port or other port of a smartphone, tablet device, personal computer, laptop, etc. FIG. 6 illustrates a display screen 600 that is displayed after the PRD 104 communicates with the computing device. The display screen 600 displays folders, e.g., a folder 602 for merchandise receipts and a folder 604 for service receipts. The user may generate a variety of other or different types of folders and subfolders in which the user may place receipts. Accordingly, a user may utilize the PRD 104 to electronically organize electronically stored receipts.

In addition to the environmental concerns resulting from utilizing paper receipts, paper receipts often provide many organizational difficulties. Many consumers often have to tediously organize massive quantities of paper receipts and then have to tediously search for a particular receipt. Many other consumers do not organize receipts and then may lose some receipts. The PRD 104 allows a consumer to help diminish the environmental concerns of utilizing paper receipts and benefit from such environmentally friendly solution by being able to better organize receipts.

In another embodiment, a user that selects the e-mail alternative may benefit from electronic receipt organization. For instance, a program or application may be utilized to store a particular e-mail and/or electronic receipt directly to the PRD 104. The user may then organize the electronic receipt by placing the electronic receipt into a particular folder. Accordingly, a user that directly electronically stores the electronic receipt to the PRD 104 or subsequently downloads the electronic receipt from an e-mail server for storage at the PRD 104 may benefit from being able to organize electronic receipts at the PRD 104.

In yet another embodiment, the program or application may be utilized to also store e-mails and/or electronic receipts from remote points of transaction along with the electronic receipts for points of transaction. For example, a user may have an electronic receipt for a purchase of the product for purchase 106 from a point of transaction. The user may also perform an online purchase from a remote point of transaction. The user may receive an e-mail with an electronic receipt for the remote point of transaction purchase. The user may utilize the program to download the electronic receipt for the remote point of transaction purchase to the storage device at the PRD 104 so that the user may store electronic receipts at points of transaction and electronic receipts from remote points of transaction at the same storage device. As a result, a user is able to organize electronic receipts irrespective of whether the electronic receipts are from a point of transaction or a remote point of transaction.

In addition to privacy concerns regarding providing an e-mail address or other communication identifier, some consumers that want to utilize an environmentally friendly approach to paper receipts request a paper receipt out of concern for a possible return of the product 106 for purchase. Such consumers are often concerned that having an electronic receipt e-mailed may then lead to a cumbersome return, e.g., finding the e-mail with the receipt, printing the e-mail with the receipt, etc. Accordingly, such consumers may often simply decide to have a paper receipt printed after providing payment.

Figure 7:
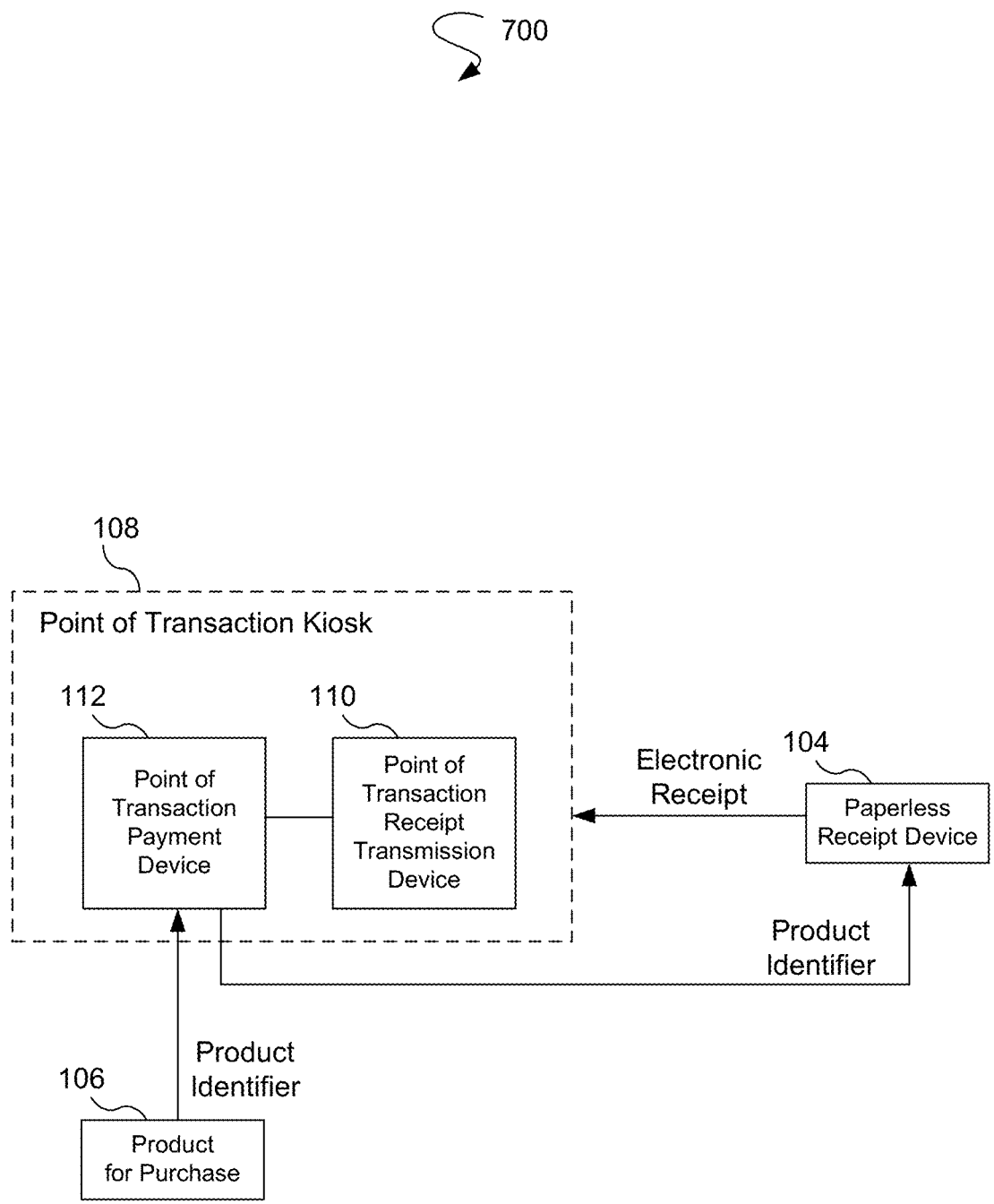
FIG. 7 illustrates a PRD configuration that may be utilized for a return of the product for purchase by utilizing the PRD.

FIG. 7 illustrates a PRD configuration 700 that may be utilized for a return of the product 106 for purchase by utilizing the PRD 104. The PRD 104 allows a user to return the product 106 for purchase without printing a paper version of the electronic receipts stored at the PRD 104.

The consumer brings the PRD 104 along with the product 106 for purchase to the store to return the product 106 for purchase. The consumer presents the product 106 for purchase and the PRD 104 at the point of transaction kiosk 108, which may or may not be operated by the point of transaction representative 114. A product identifier corresponding to the product 106 for purchase, e.g., a barcode, tag, etc., is then sent to the point of transaction payment device 112 or other receiver. For example, the product identifier may be scanned.

In an embodiment, electronic receipts are stored at the PRD 104 or e-mailed with the product identifier during purchase or other form of transaction. During the return, the point of transaction payment device 112 or other device sends the product identifier to the PRD 104 so that the PRD 104 may retrieve the particular electronic receipt. For example, the PRD 104 may utilize a processor to search the various labels of the electronic receipts stored at the PRD 104. Upon finding the electronic receipt associated with the product identifier, the PRD 104 then sends the electronic receipt to the point of transaction kiosk 108. The point of transaction kiosk 108 may then verify that the product identifier corresponds to the electronic receipt. The return may then be performed by the point of transaction payment device 112 by returning payment to the consumer. Any further receipts verifying the return may be electronically e-mailed or stored at the PRD 104 by utilizing the PRD 104.

The point of transaction representative 114 may perform the verification and/or the return of payment. Alternatively, the point of transaction kiosk 108 may automatically perform the verification and/or the return of payment. Exchanges and other similar types of transactions may also be performed in a similar manner.

The product identifier is an example of a transaction identifier. Another example of a transaction identifier is a service identifier. Accordingly, refunds, exchanges, etc. may be performed for services as well as products with the PRD 104.

Accordingly, the PRD 104 allows a user to perform each task from product purchase to product return electronically without any paper receipts. Further, the user does not have to be concerned with maintaining and organizing a stack of receipts. The user does not even have to find or review the receipt for a return. For example, the user may purchase the product 106 for purchase at a store and have the receipt electronically stored at the PRD 104. The user may then bring the product 106 for purchase to the store for return and obtain a refund without even searching for the receipt or reviewing the receipt. The user may simply have the receipt stored at the PRD 104 by having the PRD 104 scanned during purchase and then have the receipt retrieved by having the PRD 104 scanned during return. In addition to helping diminish the environmental concerns of paper receipts, the user benefits from a simpler approach to purchase and return.

Figure 8:
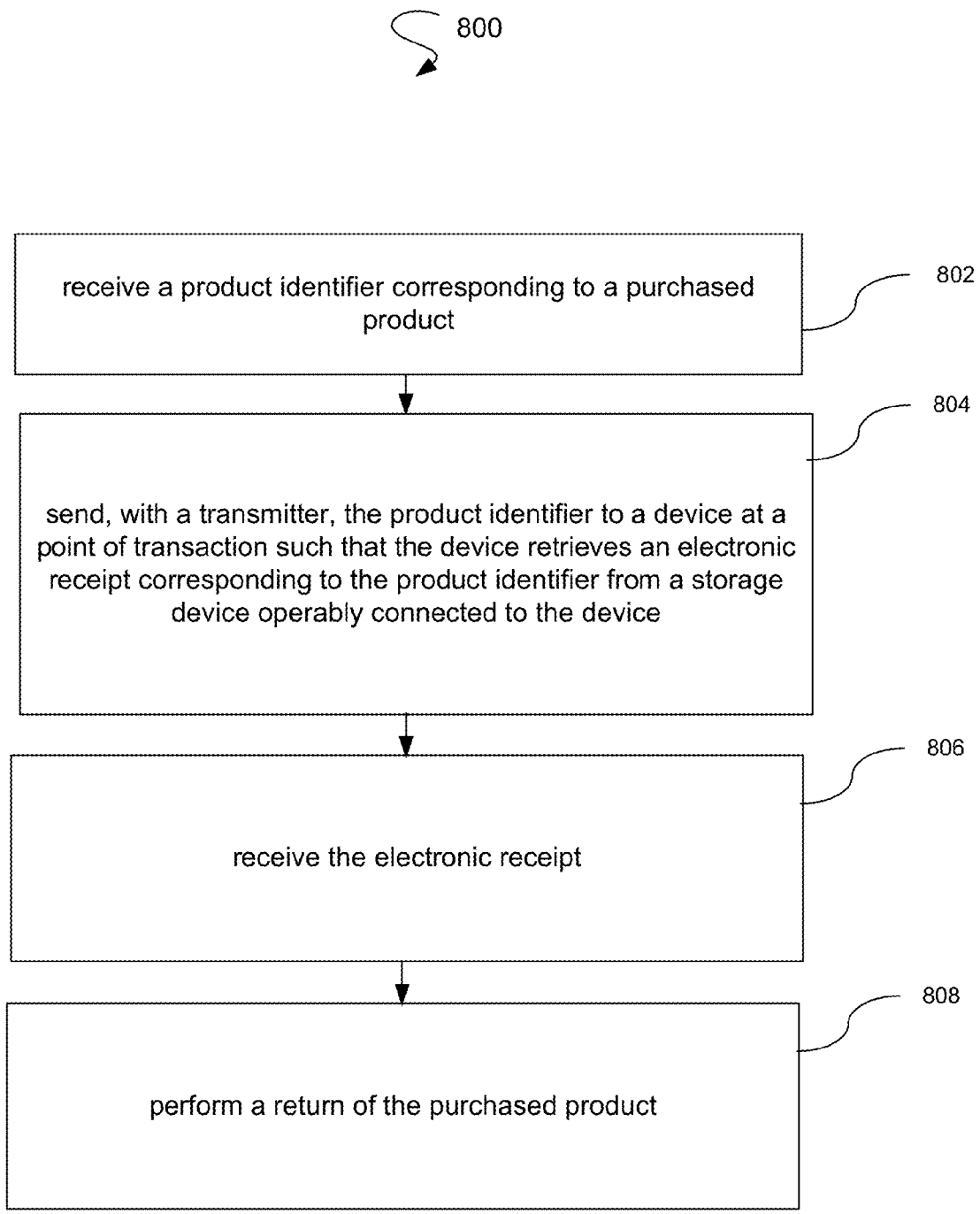
FIG. 8 illustrates a process that may be utilized to perform a return of the product for purchase based upon a paperless electronic receipt.

FIG. 8 illustrates a process 800 that may be utilized to perform a return of the product 106 for purchase based upon a paperless electronic receipt. At a process block 802, the process 800 receives a product identifier corresponding to a purchased product. Further, at a process block 804, the process 800 sends, with a transmitter, the product identifier to a device at a point of transaction such that the device retrieves an electronic receipt corresponding to the product identifier from a storage device operably connected to the device. In addition, at a process block 806, the process 800 receives the electronic receipt. At a process block 808, the process 800 performs a return of the purchased product.

Figure 9:
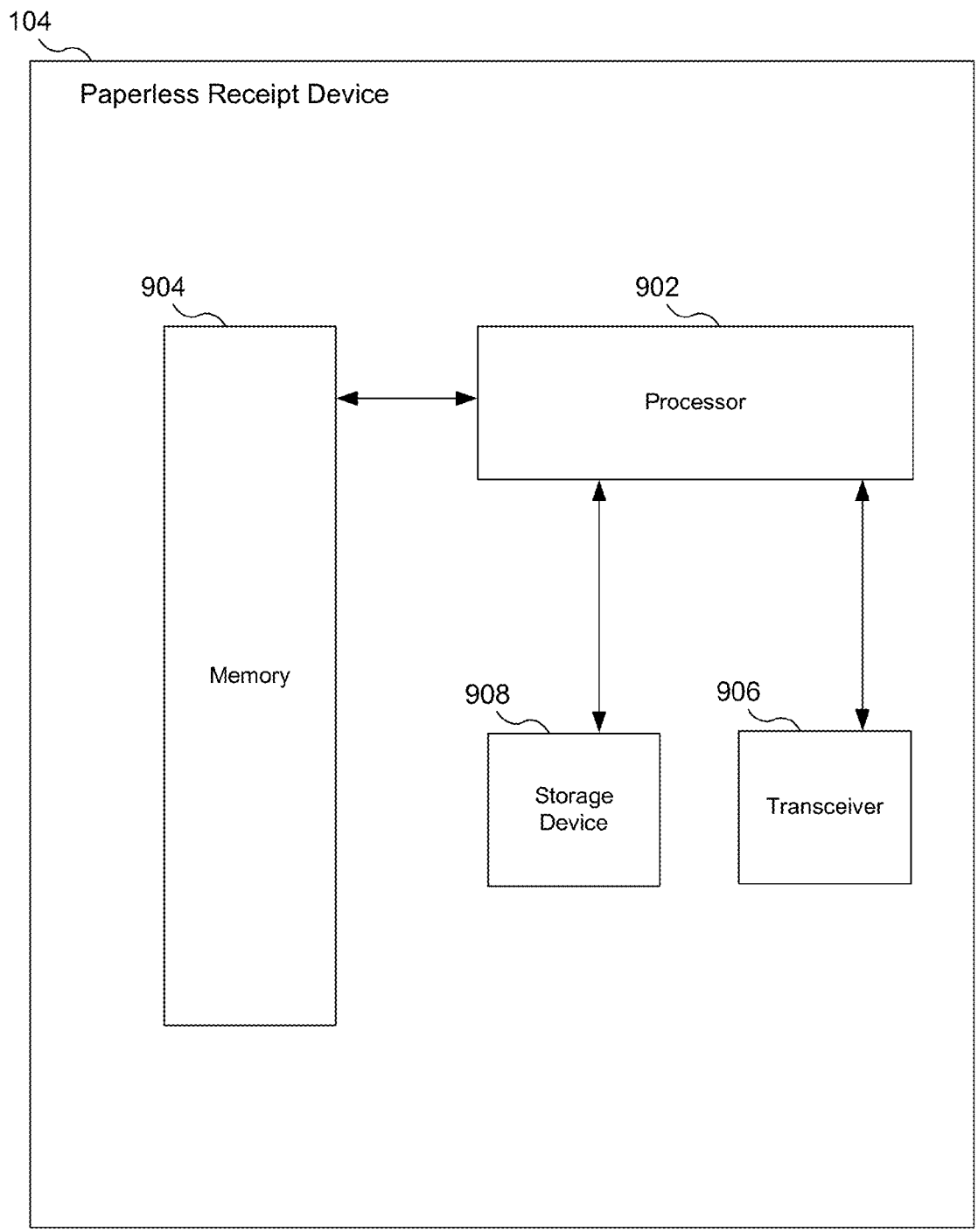
FIG. 9 illustrates a PRD configuration in which the PRD includes the components for paperless receipts.

The PRD 104 may be implemented in a variety of different configurations. FIG. 9 illustrates a PRD configuration 900 in which the PRD 104 includes the components for paperless receipts. In an embodiment, the PRD configuration 900 includes a processor 902, a memory 904, a transceiver 906, and a storage device 908. The processor 902 may store data in the memory 904 for processing, provide commands to the transceiver 906 to send and/or receive data, and store and/or search the storage device 908 for data. Alternatively, multiple processors 902 may be utilized. Further, a distinct transmitter and a distinct receiver may be utilized instead of the transceiver 906. Certain implementations may only utilize a transmitter rather than a receiver whereas other implementations may only utilize a receiver rather than a transmitter.

In an embodiment, the storage device 908 may be utilized to store the communication identifier, e.g., e-mail address, and the electronic receipts. In another embodiment, a distinct storage device may be utilized to store the communication identifier and a distinct storage device may be utilized to store the electronic receipts.

An example of the PRD 104 configuration is a device that may be utilized in conjunction with a keychain. A user may simply present the PRD 104 at a point of transaction so that the PRD 104 may be scanned to allow the user to select from an e-mail and/or direct storage of an electronic receipt at the PRD 104. A user that does not want to store an e-mail address at the PRD 104 may still utilize the PRD 104 to directly store electronic receipts at the PRD 104. Accordingly, users that are technologically savvy as well as users that are not technologically savvy may utilize the PRD 104 to electronically store electronic receipts. The PRD 104 allows various users and points of transactions to help diminish or eliminate the utilization of paper receipts.

The PRD configuration 900 allows for portability. For example, the PRD 900 may have USB communication capability. Accordingly, the PRD 900 may be plugged into various types of computing devices so that a user that wants to review electronic receipts regularly may perform such review on various devices. For example, the user may have a PRD 104 for a keychain. The user may then regularly plug the PRD 104 into a smartphone, tablet device, personal computer, laptop, etc. to review the electronic receipts. As an example, a user leaving a store may plug the PRD 104 into a smartphone to review the electronic receipt for the product 106 for purchase. The user may then later plug the PRD 104 into a personal computer to more easily review and organize various electronic receipts on a display screen with different dimensions than that of a smartphone.

Figure 10:
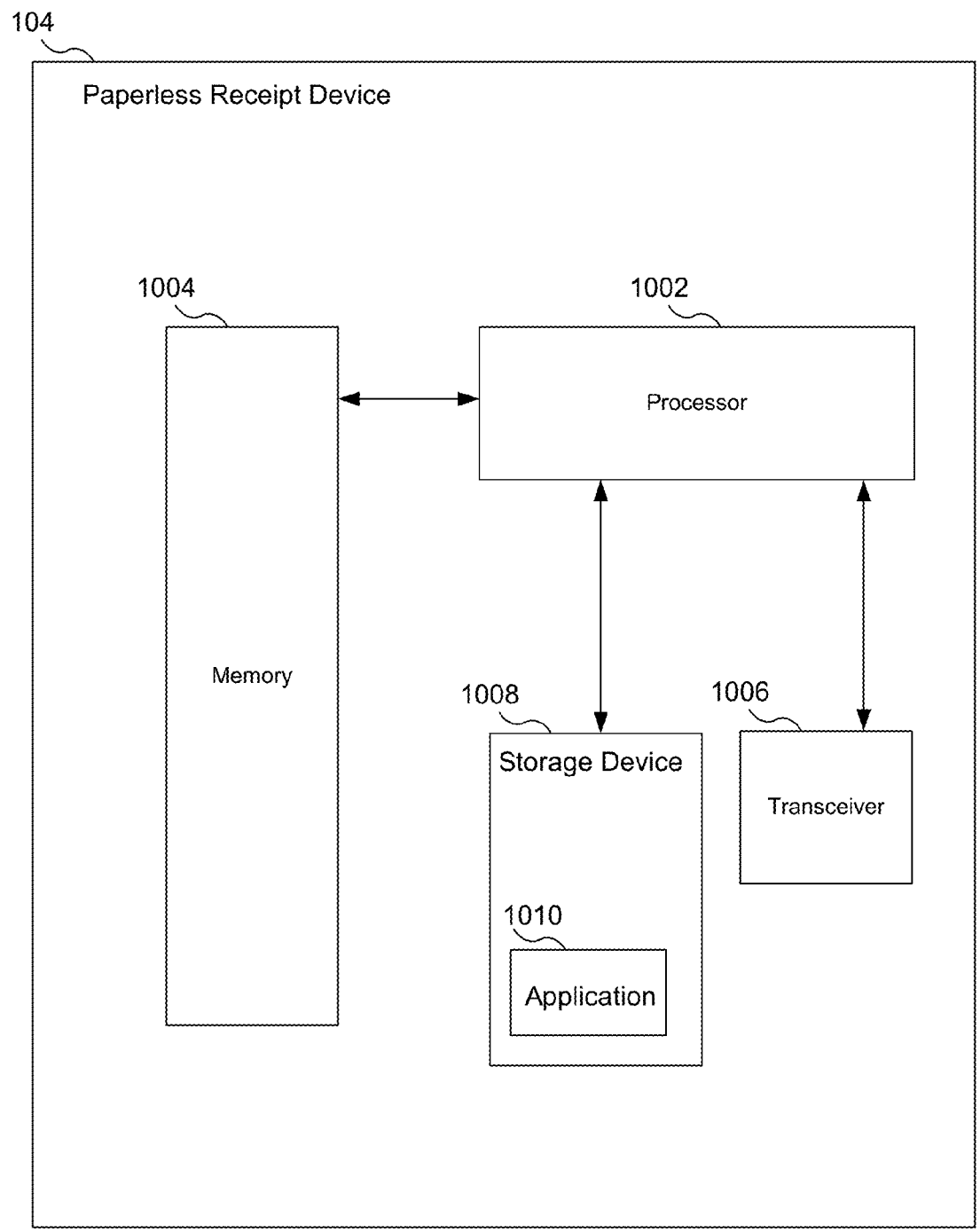
FIG. 10 illustrates a PRD configuration in which the PRD is a computing device.

FIG. 10 illustrates a PRD configuration 1000 in which the PRD 104 is a computing device. Examples of a computing device include a smartphone, a tablet device, a personal computer, a laptop, etc. In an embodiment, the PRD configuration 1000 includes a processor 1002, a memory 1004, a transceiver 1006, a storage device 1008, and an application 1010. The application may be a computer program that is either preinstalled or downloadable to the PRD 104. The application may be a program that the processor 1002 loads into the memory 1004 to perform the functionality of the PRD 104.

In other words, the PRD 104 may be implemented as a computing device so that a user does not have to have a distinct computing device, e.g., smartphone, and a distinct PRD 104. The user may perform typical smartphone functionality, e.g., telephone conversations, in conjunction with the ability to perform PRD 104 functionality.

The processor 1002 may store data in the memory 1004 for processing, provide commands to the transceiver 1006 to send and/or receive data, and store and/or search the storage device 908 for data. Alternatively, multiple processors 1002 may be utilized. Further, a distinct transmitter and a distinct receiver may be utilized instead of the transceiver 1006. Certain implementations may only utilize a transmitter rather than a receiver whereas other implementations may only utilize a receiver rather than a transmitter.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes, systems, apparatuses, and computer program products. Therefore, it is to be understood that, within the scope of the appended claims, the present processes, systems, apparatuses, and computer program products may be practiced other than as specifically described herein.

I claim:

1. An apparatus comprising:
   a storage device that stores a communication identifier prior to a transaction at a point of transaction, the communication identifier being an e-mail address;
   a transmitter in operable communication with the storage device that automatically sends the communication identifier to a point of transaction receipt transmission device at a point of transaction without a manual entry of the communication identifier at the point of transaction so that the point of transaction receipt transmission device sends an electronic receipt of a transaction at the point of transaction to the communication identifier.

2. The apparatus of claim 1, wherein the transmitter is a wireless transmitter that wirelessly sends the communication identifier to the point of transaction receipt transmission device.

3. The apparatus of claim 1, wherein the transmitter sends the communication identifier to the point of transaction receipt transmission device through an integrated connection.

4. An apparatus comprising:
   a point of transaction payment device that processes a payment for a transaction at a point of transaction; and
   a transmitter in operable communication with the point of transaction payment device that automatically receives an e-mail address from a paperless receipt device in proximity to the point of transaction payment device without a manual entry of the e-mail address at the point of transaction and transmits an electronic receipt corresponding to the payment for the transaction to the e-mail address, the e-mail address being stored on the paperless receipt device prior to the transaction.

* * * * *